(12) United States Patent
Davydov et al.

(10) Patent No.: US 10,411,942 B2
(45) Date of Patent: *Sep. 10, 2019

(54) TECHNIQUES FOR USING A MODULATION AND CODING SCHEME FOR DOWNLINK TRANSMISSIONS

(71) Applicant: Intel Corporation, Santa Clara, CA (US)

(72) Inventors: Alexei Davydov, Nizhny-Novgorod (RU); Hwan-Joon Kwon, Santa Clara, CA (US); Gregory V. Morozov, Nizhny-Novgorod (RU); Alexander Maltsev, Nizhny-Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,384

(22) Filed: Jun. 30, 2017

(65) Prior Publication Data

US 2017/0302497 A1 Oct. 19, 2017

Related U.S. Application Data

(63) Continuation of application No. 14/564,682, filed on Dec. 9, 2014, now Pat. No. 9,722,848.

(51) Int. Cl.
*H04L 27/34* (2006.01)
*H04L 27/36* (2006.01)
(Continued)

(52) U.S. Cl.
CPC ............ *H04L 27/36* (2013.01); *H04L 1/0016* (2013.01); *H04L 1/0023* (2013.01);
(Continued)

(58) Field of Classification Search
CPC ....... H04W 4/08; H04W 24/08; H04W 24/10; H04W 28/18; H04W 72/04;
(Continued)

(56) References Cited

U.S. PATENT DOCUMENTS 6,614,854 B1 9/2003 Chow et al.
9,332,527 B2 5/2016 Gou et al.
(Continued)

FOREIGN PATENT DOCUMENTS

WO 2011014685 A2 2/2011
WO 2013112733 A1 8/2013
(Continued)

OTHER PUBLICATIONS

Korean and English Translation of Korean Office Action for Patent Application No. 10-2016-7027922, dated Mar. 20, 2018, 9 pages.
(Continued)

*Primary Examiner* — Jeffrey M Rutkowski
*Assistant Examiner* — Jonathan Wood
(74) *Attorney, Agent, or Firm* — Compass IP Law PC

(57) ABSTRACT

Examples include techniques for using a modulation and coding scheme (MCS) for downlink transmissions. In some examples information elements (IEs) for either a physical multicast channel (PMCH) or a physical multicast control channel (PMCCH) include information to indicate an MCS for downlink transmission over a PMCH or PMCCH between an evolved Node B (eNB) and user equipment (UE). For these examples, the information in the IEs include indications of whether higher order modulation for quadrature amplitude modulation (QAM) have or have not been enabled. Both the UE and the eNB may operate in compliance with one or more $3^{rd}$ Generation Partnership Project (3GPP) Long Term Evolution (LTE) standards.

18 Claims, 13 Drawing Sheets

System 100

Related U.S. Application Data

(60) Provisional application No. 61/990,639, filed on May 8, 2014.

(51) Int. Cl.
*H04L 1/00* (2006.01)
*H04L 5/00* (2006.01)
*H04L 12/18* (2006.01)
*H04W 4/08* (2009.01)

(52) U.S. Cl.
CPC ............ *H04L 12/189* (2013.01); *H04L 27/34* (2013.01); *H04L 5/0053* (2013.01); *H04W 4/08* (2013.01)

(58) Field of Classification Search
CPC ........... H04W 72/042; H04W 72/0406; H04W 74/002; H04W 74/0833; H04W 88/02; H04W 88/08; H04L 1/0003; H04L 1/0009; H04L 1/0016; H04L 12/18; H04L 12/189; H04L 27/2601; H04L 27/32; H04L 27/34
See application file for complete search history.

(56) References Cited

U.S. PATENT DOCUMENTS

| | | | |
|---|---|---|---|
| 9,432,168 B2 | 8/2016 | Kim et al. | |
| 9,667,361 B2* | 5/2017 | Nagata | H04L 27/2275 |
| 2003/0002495 A1 | 1/2003 | Shahar et al. | |
| 2005/0100050 A1* | 5/2005 | Huang | H04L 27/3488 |
| | | | 370/476 |
| 2005/0120097 A1 | 6/2005 | Walton et al. | |
| 2010/0067512 A1 | 3/2010 | Nam et al. | |
| 2010/0272004 A1 | 10/2010 | Maeda et al. | |
| 2011/0149830 A1 | 6/2011 | Kim et al. | |
| 2012/0257562 A1 | 10/2012 | Kim et al. | |
| 2012/0300732 A1 | 11/2012 | Ode | |
| 2013/0094428 A1 | 4/2013 | Lee | |
| 2013/0128768 A1 | 5/2013 | Balasubramanian et al. | |
| 2013/0195058 A1 | 8/2013 | Ode | |
| 2013/0223255 A1 | 8/2013 | Enescu et al. | |
| 2013/0223322 A1 | 8/2013 | Ode | |
| 2013/0242716 A1 | 9/2013 | Amerga et al. | |
| 2013/0242819 A1 | 9/2013 | He et al. | |
| 2013/0250882 A1 | 9/2013 | Dinan | |
| 2013/0258935 A1 | 10/2013 | Zhang et al. | |
| 2013/0294369 A1 | 11/2013 | Dinan | |
| 2013/0301509 A1 | 11/2013 | Pumadi et al. | |
| 2014/0119263 A1 | 5/2014 | Shauh et al. | |
| 2014/0119264 A1 | 5/2014 | Shauh et al. | |
| 2014/0119265 A1 | 5/2014 | Shaun et al. | |
| 2014/0153471 A1 | 6/2014 | Zhang et al. | |
| 2014/0169297 A1* | 6/2014 | Kim | H04L 5/0092 |
| | | | 370/329 |
| 2014/0169300 A1 | 6/2014 | Kim et al. | |
| 2014/0192732 A1* | 7/2014 | Chen | H04L 1/0003 |
| | | | 370/329 |
| 2014/0198707 A1 | 7/2014 | Wang et al. | |
| 2014/0198749 A1 | 7/2014 | Luo et al. | |
| 2014/0301210 A1 | 10/2014 | Kim et al. | |
| 2014/0307703 A1* | 10/2014 | Gaal | H04L 5/0073 |
| | | | 370/330 |
| 2014/0355507 A1 | 12/2014 | Amerga et al. | |
| 2014/0376453 A1 | 12/2014 | Smith | |
| 2015/0078292 A1 | 3/2015 | Walker et al. | |
| 2015/0098440 A1 | 4/2015 | Yang et al. | |
| 2015/0124686 A1 | 5/2015 | Zhang et al. | |
| 2015/0172066 A1 | 6/2015 | Gholmieh et al. | |
| 2015/0180676 A1 | 6/2015 | Bao et al. | |
| 2015/0195819 A1 | 7/2015 | Kwon et al. | |
| 2015/0215913 A1* | 7/2015 | Cheng | H04L 1/0001 |
| | | | 370/330 |
| 2015/0271794 A1* | 9/2015 | Kang | H04L 1/0003 |
| | | | 370/329 |
| 2015/0280877 A1 | 10/2015 | Chen et al. | |
| 2015/0296503 A1* | 10/2015 | Larsson | H04W 72/048 |
| | | | 370/329 |
| 2015/0304080 A1 | 10/2015 | Yi et al. | |
| 2015/0312082 A1* | 10/2015 | Shin | H04L 27/362 |
| | | | 370/329 |
| 2015/0326360 A1 | 11/2015 | Malladi et al. | |
| 2015/0358877 A1 | 12/2015 | Wei et al. | |
| 2015/0382328 A1* | 12/2015 | Jiang | H04L 1/0004 |
| | | | 370/329 |
| 2016/0021656 A1 | 1/2016 | Park | |
| 2016/0036618 A1 | 2/2016 | Einhaus et al. | |
| 2016/0057735 A1 | 2/2016 | Liu et al. | |
| 2016/0087810 A1 | 3/2016 | Zhang et al. | |
| 2016/0119762 A1 | 4/2016 | Zhu | |
| 2016/0135194 A1 | 5/2016 | Kim et al. | |
| 2016/0211904 A1 | 7/2016 | Kim et al. | |
| 2016/0212771 A1 | 7/2016 | Koskinen | |
| 2016/0366007 A1* | 12/2016 | Hwang | H04L 27/3809 |
| 2017/0070374 A1* | 3/2017 | Nakamura | H04L 1/0005 |
| 2017/0079049 A1* | 3/2017 | Yamada | H04B 7/0626 |
| 2017/0126439 A1* | 5/2017 | Yoshimoto | H04W 24/10 |
| 2017/0171014 A1* | 6/2017 | Chen | H04L 1/0003 |
| 2017/0180099 A1* | 6/2017 | Kim | H04L 27/0012 |

FOREIGN PATENT DOCUMENTS

| | | |
|---|---|---|
| WO | 2013191753 A1 | 12/2013 |
| WO | 2014029108 A1 | 2/2014 |
| WO | 2015175790 A1 | 11/2015 |
| WO | 2016006860 A1 | 1/2016 |

OTHER PUBLICATIONS

Taiwan IPO Search Report for Patent Application No. 105140652, Received Jan. 10, 2018, 1 page.

"Candidate for physical layer measurement", NEC Group, 3GPP TSG-RAN WG1 #74-bis, R1-134245, Oct. 7-11, 2013, 3 pages, (author unknown).

"On standard impacts of 256QAM in downlink", ZTE, 3GPP TSG-RAN WG1 Meeting #76bis, R1-141399, Mar. 31, 2014, 11 pages, (author unknown).

Calabuig, et al. "AL-FEC for streaming services in LTE E-MBMS", EURASIP Journal on Wireless Communications and Networking, Mar. 15, 2013.

CMCC: "Configuration and MCS table design for higher order modulation", 3GPP DRAFT; RI-141611, 3rd Generation Partnership Project (3GPP), Mobile Competence Centre; 650, Route Des Lucioles; F-06921 Sophia-Antipolis Cedex France, Mar. 31, 2014, 6 pages.

English Translation of Notice for the Reasons for Rejection for Japanese Patent Application No. 2016-563956, dated Nov. 14, 2017, 9 pages.

English Translation of the Notice of Preliminary Rejection, Patent Application No. 10-2016-7027922, dated Aug. 1, 2017, 12 pages.

Extended European Search Report for Patent Application No. 15789914.7, dated Dec. 6, 2017, 11 pages.

Intel Corporation: "Discussion on configuration aspects for 256QAM", 3GPP Draft; RI-141153 Discussion on Configuration Aspects for 256QAM, 3rd Generation Partnership Project (3GPP), Mobile Competence Centre; 650, Route Des Lucioles; F-06921 Sophia-Antipolis Cedex; France, Mar. 31 2014, 3 pages.

International Search Report and Written Opinion received for PCT Patent Application No. PCT/US2015/024493, dated Jun. 29, 2015, 12 pages.

Notice of Allowance for U.S. Appl. No. 14/564,682, dated Mar. 31, 2017, 17 pages.

Notice of Allowance Received for Taiwanese Patent Application No. 104111126, dated Nov. 8, 2016, 3 pages including 1 page of English translation.

Office Action and Search Report received for Taiwanese Patent Application No. 104111126, dated May 3, 2016, 4 pages.

(56) References Cited

OTHER PUBLICATIONS

Office Action for U.S. Appl. No. 14/564,682, dated Sep. 16, 2016, 31 pages.
Panasonic: "MCS Indication for 256QAM", 3GPP Draft; RI-140502, 3rd Generation Partnership Project (3GPP), Mobile Competence Centre ; 650, Route Des Lucioles ; F-06921 Sophia-Antipolis Cedex ; France. Feb. 10, 2014, 6 pages.
Russian and English Translation of Russian Office Action for Patent Application No. 2016139437, dated Dec. 6, 2017, 8 pages.
Indian Examination Report for Indian Patent Application No. 201647034560, dated Mar. 29, 2019, 7 pages.

\* cited by examiner

PMCH-InfoList IE 200

```
-- ASN1START

PMCH-InfoList-r12 ::=          SEQUENCE (SIZE (0..maxPMCH-PerMBSFN)) OF PMCH-
Info-r12
{
   ...

PMCH-Config-r12 ::=            SEQUENCE {
      Sf-AllocEnd-r12              INTEGER (0..1535),
      256QamEnable-r12             BOOLEAN,
      dataMCS-r12                  INTEGER (0..28),
      mch-SchedulingPeriod-r12     Enumerated {
                                   rf8, rf16, rf32, rf64 rf128, rf256, rf512,
rf1024},
   ...
}
```

*FIG. 2*

MBSFN-AreaInfoList IE 300

```
-- ASN1START

MBSFN-AreaInfoList-r12 ::=              SEQUENCE (SIZE (1..maxMBSFN-Area)) OF MBSFN-
AreaInfo-r12

MBSFN-AreaInfo-r12 ::=                  SEQUENCE {
    mbsfn-AreaId-r12                        INTEGER (0...255),
    non-MBSFNregionLength                   Enumerated {s1, s2},
    notificationIndicator-r12               INTEGER (0..7),
    mcch-Config-r12                         SEQUENCE {
        mcch-RepetitionPeriod-r12               ENUMERATED {rf32, rf64, rf128, rf256},
        mcch-Offset-r12                         INTEGER (0..10),
        mcch-ModificationPeriod-r12             ENUMERATED {rf512, rf1024},
        sf-AllocInfo-r12                        BIT STRING (SIZE (6)),
        signallingMCS-r12                       ENUMERATED {n2, n7, n13, n19, nx}
    },
    ...
}

-- ASN1STOP
```

*FIG. 3*

Index Table 400
(256QAM Not Enabled)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

*FIG. 4*

Index Table 500

(256QAM Enabled)

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | reserved |
| 30 | 6 | reserved |
| 31 | 8 | reserved |

MCS Selections For 256QAM When Enabled: MCS Index 20–27

GENERATE, AT AN eNB CAPABLE OF OPERATING IN COMPLIANCE WITH ONE OR MORE 3GPP LTE STANDARDS INCLUDING LTE-A, A PMCH-InfoList IE THAT INCLUDES A FIELD INDICATING 256QAM IS ENABLED FOR DOWNLINK TRANSMISSIONS TO ONE OR MORE UEs OVER A PMCH
702

SELECT A VALUE FOR A dataMCS FIELD OF THE PMCH-InfoList IE THAT INDICATES A FIRST MCS TO USE FOR THE DOWNLINK TRANSMISSIONS TO THE ONE OR MORE UEs OVER THE PMCH, THE VALUE BASED ON WHETHER 256QAM IS ENABLED
704

SEND THE PMCH-InfoList IE TO THE ONE OR MORE UEs
706

*FIG. 7*

Storage Medium 800

*Computer Executable Instructions for 700*

RECEIVE, AT AN UE CAPABLE OF OPERATING IN COMPLIANCE WITH ONE OR MORE 3GPP LTE STANDARDS INCLUDING LTE-A, A PMCH-InfoList IE FROM ONE OR MORE eNBs THAT INCLUDES A FIELD INDICATING WHETHER 256QAM IS ENABLED FOR RECEIVING DOWNLINK TRANSMISSIONS OVER A PMCH FROM THE ONE OR MORE eNBs
1002

DETERMINE WHETHER 256QAM IS ENABLED
1004

DETERMINING A FIRST MCS TO USE FOR RECEIVING DOWNLINK TRANSMISSIONS OVER THE PMCH BASED ON A VALUE INDICATED IN A dataMCS FIELD OF THE PMCH-InfoList IE AND BASED ON WHETHER 256QAM IS DETERMINED TO BE ENABLED
1006

USE THE FIRST MCS TO RECEIVE DOWNLINK TRANSMISSIONS OVER THE PMCH FROM THE ONE OR MORE eNBs
1008

*FIG. 10*

Storage Medium 1100

Computer Executable Instructions for 1000

FIG. 11

TECHNIQUES FOR USING A MODULATION AND CODING SCHEME FOR DOWNLINK TRANSMISSIONS

RELATED CASE

This application is a continuation of U.S. patent application Ser. No. 14/564,682 filed Dec. 9, 2014, entitled "TECHNIQUES FOR USING A MODULATION AND CODING SCHEME FOR DOWNLINK TRANSMISSIONS", which in turn claims priority to U.S. Provisional Patent Application No. 61/990,639 filed May 8, 2014, that is hereby incorporated by reference in its entirety.

TECHNICAL FIELD

Examples described herein are generally related to wireless communication devices.

BACKGROUND

Wireless communication networks may deploy base stations to support or service small cells to address capacity issues associated with high density user equipment (UE) scenarios. High geometry or signal-to-noise ratios (SNRs) for UEs receiving downlink transmissions from small cell base stations may allow for higher order modulation schemes. These higher order modulation schemes may be higher than a typical peak of 64 quadrature amplitude modulation or 64QAM. A 64QAM may be set as a peak for physical multicast channel (PMCH) transmissions carrying a multicast traffic channel (MTCH) between a base station and one or more UEs.

BRIEF DESCRIPTION OF THE DRAWINGS

FIG. 2 illustrates an example physical multicast channel-InfoList (PMCH-InfoList) information element (IE).

FIG. 3 illustrates an example multi-broadcast single frequency network-AreaInfoList (MBSFN-AreaInfoList) IE.

FIG. 4 illustrates an example first index table.

FIG. 5 illustrates an example second index table.

FIG. 7 illustrates an example of a first logic flow.

FIG. 8 illustrates an example of a first storage medium.

FIG. 10 illustrates an example of a second logic flow.

FIG. 11 illustrates an example of a second storage medium.

DETAILED DESCRIPTION

Figure 1:
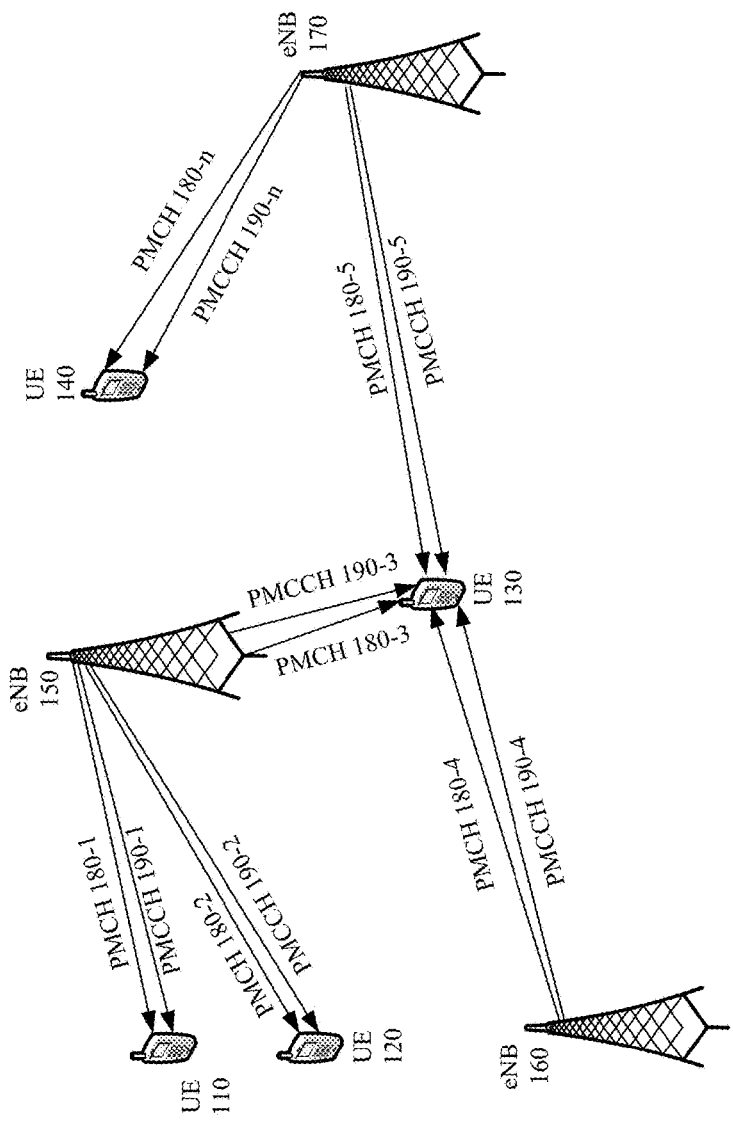
FIG. 1 illustrates an example of a system.

Examples are generally directed to improvements that may involve use of wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10, 11 or 12 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, higher order modulation schemes above 64QAM may be possible for UEs located within an area served by a small cell base station or eNB. In some examples, an eNB for a small cell may be arranged to support a multi-broadcast single frequency network (MBSFN) or an evolved multi-broadcast multicast service (eMBMS). The eNB may also be arranged to operate in compliance with one or more 3GPP LTE standards including LTE-A and may utilize a physical multicast channel (PMCH) for downlink transmissions to an UE. For these examples, the eNB may transmit the same data simultaneously to multiple UEs over a PMCH with these UEs. Also for these examples, multiple LTE-A compliant eNBs may transmit the same data simultaneously to one or multiple UEs using the same time-frequency resources over a PMCH with these one or multiple UEs.

Example usage scenarios of multicasting or multi-broadcasting of high-definition video for news delivery applications or supporting multiplayer gaming applications may place higher and higher data throughput demands on downlink transmissions from an eNB over a PMCH. As these throughput demands grow, the need for modulation schemes for downlink transmissions above a peak of 64QAM (e.g., 256QAM) may be necessary in high UE density scenarios to better meet these higher data throughput demands. It is with respect to these and other challenges that the examples described herein are needed.

In some first examples, techniques may be implemented that include generating, at an eNB capable of operating in compliance with one or more 3GPP LTE standards including LTE-A, a PMCH-InfoList information element (IE) that includes a field indicating whether 256QAM is enabled for downlink transmissions to one or more UEs over a PMCH. The techniques may also include selecting a value for a dataMCS field of the PMCH-InfoList IE that indicates a first modulation coding scheme (MCS) to use for the downlink transmissions to the one or more UEs over the PMCH. The value may be based on whether 256QAM is enabled. The techniques may also include sending the PMCH-InfoList IE to the one or more UEs.

In some second examples, techniques may be implemented for receiving, at an UE capable of operating in compliance with o one or more 3GPP LTE standards including LTE-A, a PMCH-InfoList IE from one or more eNBs that includes a field indicating whether 256QAM is enabled for receiving downlink transmissions over a PMCH from the one or more eNBs. The techniques may also include determining whether 256QAM is enabled. The techniques may also include determining a first MCS to use for receiving downlink transmissions over the PMCH based on a value indicated in a dataMCS field of the PMCH-InfoList IE and based on whether 256QAM is determined to be enabled. The techniques may also include using the first MCS to receive downlink transmissions over the PMCH from the one or more eNBs.

FIG. 1 illustrates an example system 100. In some examples, system 100 may be arranged to operate incompliance with one or more 3GPP LTE standards including LTE-A. For these examples, as shown in FIG. 1, system 100 may include UEs 110, 120, 130 and 140 and eNBs 150, 160 and 170. FIG. 1 also shows eNB 150 having PMCHs 180-1 to 180-3 and physical multicast control channels (PMCCHs) 190-1 to 190-3 with respective UEs 110, 120 and 130. FIG. 1 also shows eNB 160 having PMCH 180-4 and PMCCH 190-4 with UE 130. FIG. 1 also shows eNB 160 having PMCHs 180-5 and 180-n (where "n" is any positive whole integer>5) and PMCCHs 190-5 and 190-n with respective UEs 130 and 140.

According to some examples, eNB 150 may be capable of transmitting the same data nearly simultaneously (multicasting or multi-broadcasting) to UEs 110, 120 and 130 over respective PMCHs 180-1, 180-2 and 180-3. For these examples, eNB 150 may be capable of multicasting control information to UEs 110, 120 and 130 over respective PMCCHs 190-1, 190-2 and 190-3. In some examples, eNB 170 may be capable of multicasting data to UEs 130 and 140 over respective PMCHs 180-5 and 180-n and multicasting control information over respective PMCCHs 190-5 and 190-n.

In some examples, eNBs 150, 160 and 170 may be capable of multicasting data to UE 130 over respective PMCHs 180-3, 180-4 and 180-5. For these examples, eNBs 150, 160 and 170 may be capable of multicasting control information to UE 130 over respective PMCCHs 190-3, 190-4 and 190-5.

As described more below, an eNB such as eNB 150, eNB 160 or eNB 170 may include logic and/or features capable of generating a PMCH-InfoList IE that may indicate to logic and/or features at an UE such as UE 110, UE 120, UE 130 or UE 140 information for the UE to determine a first MCS to use for downlink transmissions over a PMCH with the eNB. Also, as described more below, the eNB may also include logic and/or features capable of generating a MBMS-AreaInfoList IE that may indicate to the logic and/or features at the UE information to determine a second MCS to use for downlink transmissions over a PMCCH with the eNB.

According to some examples, UEs 110, 120 or 130 may be any electronic device having wireless capabilities or equipment. For some examples, UE 110 may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

FIG. 2 illustrates an example PMCH-InfoList IE 200. In some examples, PMCH-InfoList IE 200 includes portions of a PMCH-InfoList IE related to 3GPP Rel. 12 of LTE/System Architecture Evolution (SAE). These portions are indicated by "r12" in most of the fields of PMCH-InfoList IE 200 as shown in FIG. 2. For these examples, PMCH-InfoList IE 200 may include fields as described in one or more 3GPP technical specifications (TSs) to include TS 36.331 V12.3.0 that is entitled "3GPP; TS Group Radio Access Network (RAN); E-UTRA; Radio Resource Control (RRC); Protocol specification (Release 12), published September 2014" and is hereafter referred to as TS 36.331. Although this disclosure is not limited to Rel. 12, subsequent releases to Rel. 12 of LTE/SAE and/or to TS 36.331 are also contemplated.

According to some examples, a field of PMCH-InfoList IE 200 may be arranged to indicate whether 256QAM is enabled for downlink transmissions from an eNB to one or more UEs over a PMCH. This field of PMCH-InfoList IE 200 is shown in FIG. 2 in bold-type as "256QamEnabled-r12". A Boolean data type as shown in FIG. 2 may be used to indicate whether 256QAM is enabled or disabled. For example, a Boolean value of "TRUE" may indicate that 256QAM is enabled and a Boolean value of "FALSE" may indicate that 256QAM is not enabled.

In some examples, a dataMCS field of PMCH-InfoList IE 200 may be arranged to indicate an MCS to use for downlink transmissions to the one or more UEs over PMCH. For these examples, a value in the INTEGER portion of the dataMCS field may be based on whether 256QAM is either enabled or is not enabled. The value in the INTEGER portion of the dataMCS field may be selected by logic and/or features at the eNB. The value may refer to or indicate an MCS index value for parameter $I_{MCS}$ that may indicate what modulation order applies to the MCS used for downlink transmissions. As described more below the parameter $I_{MCS}$ may refer to a given table in a 3GPP TS to include TS 36.213 V12.3.0 entitled "3GPP; TS Group RAN; E-UTRA; Physical layer procedures (Release 12), published September 2014" and is hereafter referred to as TS 36.213.

FIG. 3 illustrates an example MBSFN-AreaInfoList. In some examples, as shown in FIG. 3, MBSFN-AreaInfoList IE 300 indicates "r12" in most of the fields. For these examples, MBSFN-AreaInfoList IE 300 may include fields as shown in one or more 3GPP TSs to include TS 36.331. Although this disclosure is not limited to Rel. 12, subsequent releases to Rel. 12 of LTE/SAE and/or to TS 36.331 are also contemplated.

According to some examples, a field of MBSFN-AreaInfoList IE 300 may be arranged to include information to indicate an MCS for downlink transmissions over a PMCCH between an eNB and one or more UEs. This field of MBSFN-AreaInfoList IE 300 is shown in FIG. 3 in bold-type as "signallingMCS". For these examples, a value in the ENUMERATED portion of signallingMCS field may be selected by logic and/or features at the eNB to indicate the MCS for downlink transmission over the PMCCH.

In some examples, an ENUMERATED value for the bold-type "nx" as shown in FIG. 3 may be reserved for instances where a higher than 64QAM is to be used. For these examples, the ENUMERATED value included in the signallingMCS field nx may refer to or indicate an MCS index value for parameter $I_{MCS}$ for modulation orders greater than 6. For example, a modulation order of 6 is for 64QAM and a modulation order of 8 is for 256QAM. As described more below, depending on whether 256QAM is being used for downlink transmissions over PMCCH, a given table in TS 36.213 may be used to determine what modulation order is to be used. Also, in some examples, as shown in FIG. 3, ENUMERATED values of n2, n7, n13, n19 may have MCS index values for modulation orders of 6 or less. Thus, for these examples, "x" in ENUMERATED value nx may represent MCS index values for modulation orders of greater than 6.

FIG. 4 illustrates an example of a first index table. In some examples, as shown in FIG. 4, the first index table includes index table 400. Index table 400, as shown in FIG. 4 may be for when 256QAM is not enabled (e.g., for PMCH) or is not an option (e.g., for PMCCH). For these examples, index table 400 may be substantially similar to table 7.1.7.1-1: Modulation and TBS index table for physical downlink shared channel (PDSCH) as described in TS 36.213. Index table 400 includes MCS index values 1-31 that refer to modulation orders ($Q_m$) from 2 (4QAM) to 6 (64QAM) that may be used for downlink transmissions over either a PMCH or a PMCCH between an eNB and one or more UEs or between one or more eNBs and an UE. According to some examples, a TBS index of less than or equal to 26 may indicate modulation orders as high as 6 (64QAM) and as low as 2 (4QAM).

FIG. 5 illustrates an example of a second index table. In some examples, as shown in FIG. 5, the second index table includes index table 500. Index table 500, as shown in FIG. 5 may be for when 256QAM is enabled (e.g., for PMCH) or is an option (e.g., for PMCCH). For these examples, index table 500 may be substantially similar to table 7.1.7.1-1A: Modulation and TBS index table 2 for PDSCH as described in TS 36.213. Index table 500 includes MCS index values 1-31 that include higher modulation orders at MCS index values 20-27. As shown in FIG. 5, MCS index values 20-27 have modulation orders of 8 (256QAM). These higher modulation orders may be used for downlink transmissions over either a PMCH or a PMCCH between an eNB and one or more UEs or between one or more eNBs and an UE when 256QAM is enabled. In some examples, a TBS index of at least 25 may indicate modulation orders of 8 (256QAM).

According to some examples, logic and/or features at an eNB may generate a PMCH-InfoList IE in the format of PMCH-InfoList IE 200 and may indicate in the 256QamEnabled field that 256QAM is enabled for downlink transmissions to one or more UEs over a PMCH. For these examples, since 256QAM is enabled, index table 500 may be used as modulation values greater than 6 are included in index table 500. Also for these examples, the logic and/or features at the eNB may also select a value for the dataMCS field that refers to an MCS index value in index table 500 of 20, 21, 22, 23, 24, 25, 26 or 27. As shown in FIG. 5, all of these MCS index values for index table 500 have a modulation order of 8 (256QAM). This disclosure is not limited to values that refer MCS index values pointing to only 20, 21, 22, 23, 24, 25, 26 or 27 of a given index table used to determine an MCS. Other values referring to other MCS index values are contemplated as long as those MCS index values indicate a modulation order of at least 8.

In some examples, logic and/or features at an eNB may generate a PMCH-InfoList IE in the format of PMCH-InfoList IE 200 and may indicate in the 256QamEnabled field that 256QAM is not enabled for downlink transmissions to one or more UEs over a PMCH. For these examples, since 256QAM is not enabled index table 400 is used instead of index table 400. Also for these examples, the logic and/or features at the eNB may also select a value for the dataMCS field that refers to any of the MCS index values of 1-31. As shown in FIG. 4, these MCS index values for index table 400 have modulation orders of 6 or less.

According to some examples, logic and/or features at an eNB may generate a MBMS-AreaInfoList IE in the format of MBMS-AreaInfoList IE 300 and may indicate in the signallingMCS field a value in the ENUMERATED portion that indicates or refers to an MCS index value. For these examples, the eNB may be capable of using higher modulation orders above 6 and thus index table 500 may be used to determine what modulation order to use based on the value in the ENUMERATED portion. For example, if a modulation order of 8 (256QAM) was selected then the "x" for nx in the ENUMERATED portion may have a value of 20, 21, 22, 23, 24, 25, 26 or 27. If the modulation order were lower values such as 6 (64QAM), the ENUMERATED portion may have a value of n13 or n19. If the modulation order was 2 (4QAM), the ENUMERATED portion may have a value of n2 or n7.

Figure 6:
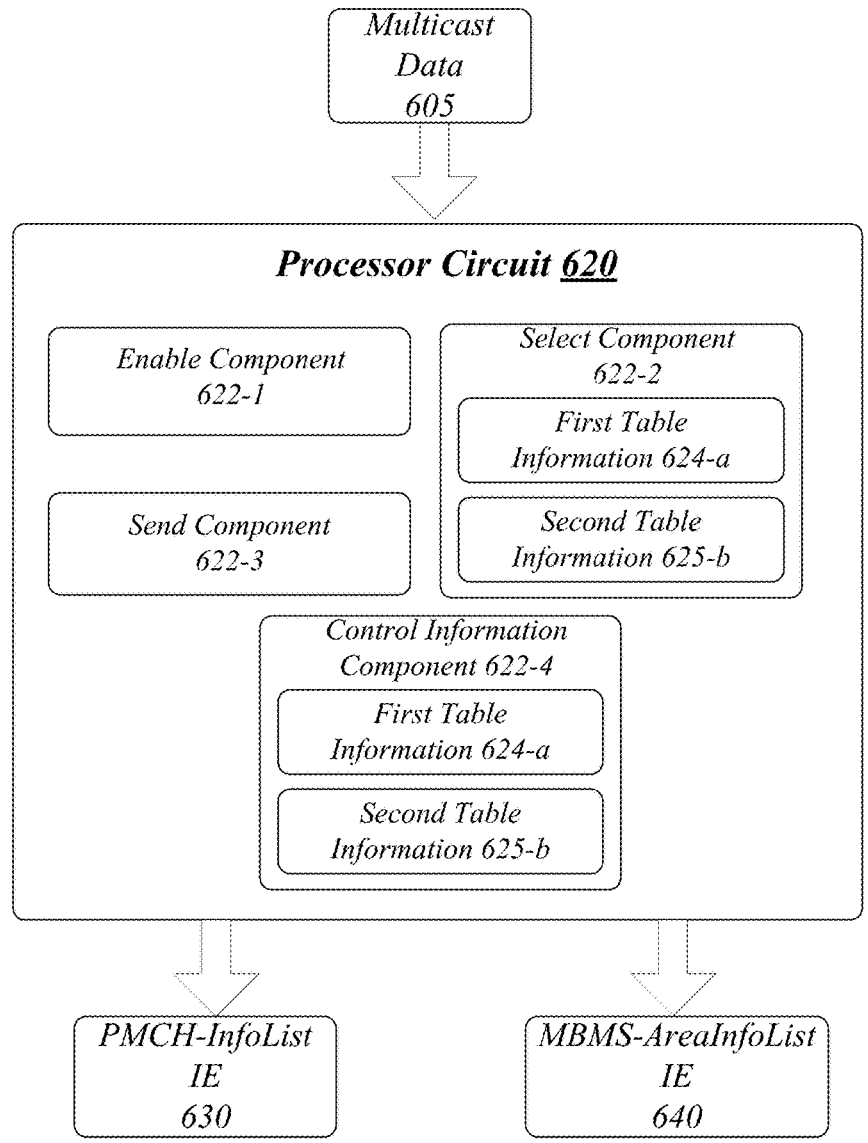
FIG. 6 illustrates an example block diagram for a first apparatus.

FIG. 6 illustrates a block diagram for an example first apparatus. As shown in FIG. 6, the example first apparatus includes apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may comprise a computer-implemented apparatus 600 having a processor circuit 620 arranged to execute one or more software components 622-a. It is worthy to note that "a" and "b" and "c" and similar designators as used herein are intended to be variables representing any positive integer. Thus, for example, if an implementation sets a value for a=4, then a complete set of software components 622-a may include components 622-1, 622-2, 622-3 or 622-4. The examples are not limited in this context.

According to some examples, apparatus 600 may be implemented in an eNB (e.g., eNB 150, 160 or 170) capable of operating in compliance with one or more 3GPP LTE Specifications including LTE-A. The examples are not limited in this context.

In some examples, as shown in FIG. 6, apparatus 600 includes processor circuit 620. Processor circuit 620 may be generally arranged to execute one or more software components 622-a. The processing circuit 620 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 620. According to some examples, processor circuit 620 may also be an application specific integrated circuit (ASIC) and at least some components 622-a may be implemented as hardware elements of the ASIC.

According to some examples, apparatus 600 may include an enable component 622-1. Enable component 622-1 may be executed by processor circuit 620 to generate a PMCH-InfoList IE that includes a field indicating whether 256QAM is enabled for downlink transmissions to one or more UEs over a PMCH. For these examples, multicast data 605 may include data to be transmitted to the one or more UEs over the PMCH and PMCH-InfoList IE may be in the example format of PMCH-InfoList IE 200.

In some examples, apparatus 600 may also include a select component 622-2. Select component 622-2 may be executed by processor circuit 620 to select a value for a dataMCS field of the PMCH-InfoList IE that indicates a first MCS to use for the downlink transmissions to the one or more UEs over the PMCH. For these examples, the value in the dataMCS field may be based on whether 256QAM is enabled. For examples were 256QAM is not enabled, the value may be based on first table information 624-a. First table information 624-a may include information similar to index table 400 shown in FIG. 4. As mentioned above, index table 400 includes modulation orders of 6 or less (e.g., 64QAM to 4 QAM). For examples were 256QAM is enabled, the value may be based on second table information 625-b. Second table information 625-b may include information similar to index table 500 shown in FIG. 5. As mentioned above, index table 500 includes modulation orders greater than 6. Both first table information 624-a and second table information 625-b may be maintained by or accessible to select component 622-2 in a data structure such as a lookup table (LUT).

According to some examples, apparatus 600 may also include a send component 622-3. Send component 622-3 may be executed by processor circuit 620 to cause the PMCH-InfoList IE to be sent to the one or more UEs. For these examples, PMCH-InfoList IE 630 may include the PMCH-InfoList IE.

In some examples, apparatus 600 may also include a control information component 622-4. Control information component 622-4 may be executed by processor circuit 620 to generate a MBMS-AreaInfoList IE that includes information in a signallingMCS field to indicate a second MCS to use for downlink transmissions to the one or more UEs over a PMCCH. For these examples, control information component 622-4 may access first table information 624-a including information similar to index table 400 if 256QAM will not be used for the PMCCH. The value in the signallingMCS field for non 256QAM may be based on first table information 624-a. If 256QAM is possibly used, then control information component 622-4 may access second table information 625-b including information similar to index table 500. The value in the signallingMCS field for possible 256QAM usage may be based on second table information 625-b. According to some examples, the MBMS-AreaInfoList IE may be included in MBMS-AreaInfoList IE 640.

Various components of apparatus 600 and a device implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by enable component 622-1, select component 622-2, or send component 622-3 for apparatus 600 located at or with an eNB.

In the illustrated example shown in FIG. 7, logic flow 700 at block 702 may generate, at an eNB capable of operating in compliance with one or more 3GPP LTE standards including LTE-A, a PMCH-InfoList IE that includes a field indicating whether 256QAM is enabled for downlink transmissions to one or more UEs over a PMCH. For these examples, enable component 622-1 may generate the PMCH-InfoList IE that includes the field indicating whether 256QAM is enabled.

According to some examples, logic flow 700 at block 704 may select a value for a dataMCS field of the PMCH-InfoList IE that indicates a first MCS to use for the downlink transmissions to the one or more UEs over the PMCH, the value based on whether 256QAM is enabled. For these examples, select component 622-2 may select the value for the dataMCS field.

In some examples, logic flow 700 at block 706 may send the PMCH-InfoList IE to the one or more UEs. For these examples, send component 622-3 may cause the PMCH-InfoList IE to be sent to the one or more UEs.

FIG. 8 illustrates an embodiment of a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
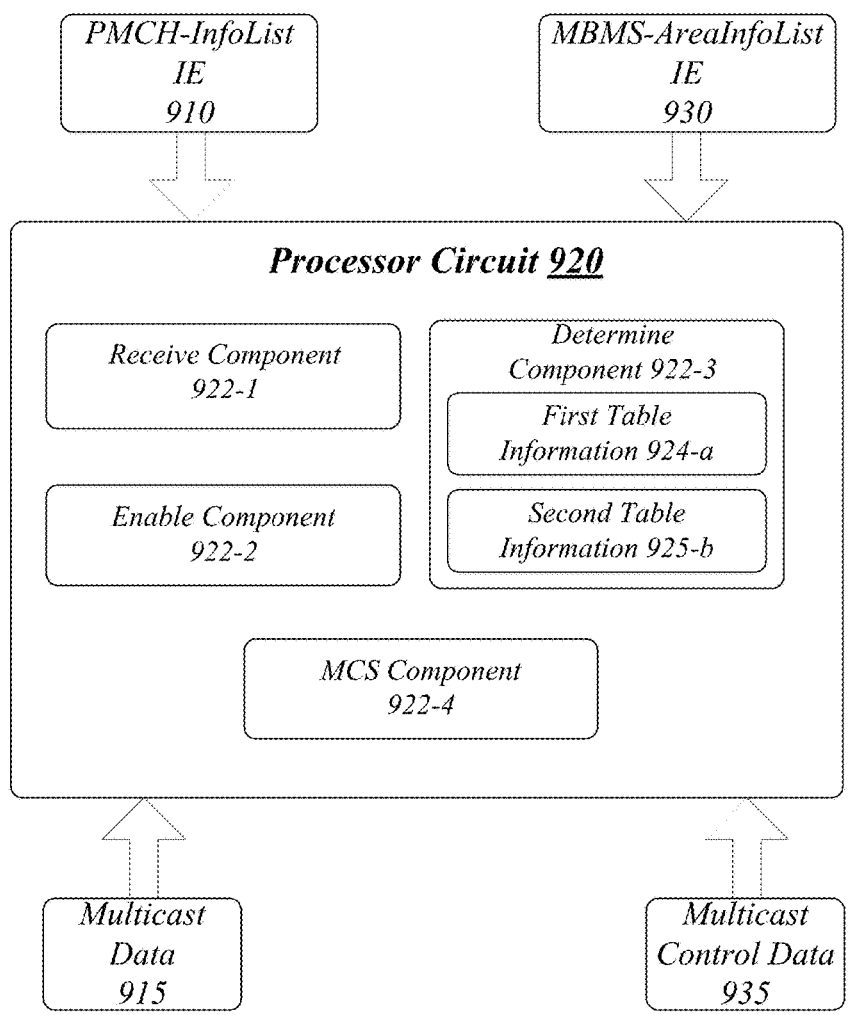
FIG. 9 illustrates an example block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a processor circuit 920 arranged to execute one or more software components 922-*a*. It is worthy to note that "a" and "b" and "c" and similar designators as used herein are intended to be variables representing any positive integer. Thus, for example, if an implementation sets a value for a=4, then a complete set of software components 922-*a* may include components 922-1, 922-2, 922-3 or 922-4. The examples are not limited in this context.

According to some examples, apparatus 900 may be implemented in an UE (e.g., UE 110, 120, 130 or 140) capable of operating in compliance with one or more 3GPP LTE Specifications including LTE-A. The examples are not limited in this context.

In some examples, as shown in FIG. 9, apparatus 900 includes processor circuit 920. Processor circuit 920 may be generally arranged to execute one or more software components 922-*a*. The processing circuit 920 can be any of various commercially available processors to include but not limited to the processors mentioned above for apparatus 600. Also, according to some examples, processor circuit 920 may also be an ASIC and at least some components 922-*a* may be implemented as hardware elements of the ASIC.

According to some examples, apparatus 900 may include a receive component 922-1. Receive component 922-1 may be executed by processor circuit 920 to receive a PMCH-InfoList IE from one or more eNBs that includes a field indicating whether 256QAM is enabled for receiving downlink transmissions over a PMCH from the one or more eNBs. For these examples, the PMCH-InfoList IE may be included in PMCH-InfoList IE 910.

In some examples, apparatus 900 may also include an enable component 922-2. Enable component 922-2 may be executed by processor circuit 920 to determine whether 256QAM is enabled. For these examples, enable component 922-2 may look to the Boolean portion of the 256QamEnabled field for the PMCH-InfoList IE that may be in the example format of PMCH-InfoList IE 200 shown in FIG. 2. If the Boolean portion indicates "TRUE" then 256QAM is enabled. If the Boolean portion indicates "FALSE" then 256QAM is not enabled.

According to some examples, apparatus 900 may also include a determine component 922-3. Determine component 922-3 may be executed by processor circuit 920 to determine a first MCS to use for receiving downlink transmissions over the PMCH based on a value indicated in a dataMCS field of the PMCH-InfoList IE and based on whether 256QAM is determined to be enabled. For these examples, determine component 922-3 may maintain (e.g., in a LUT) first table information 924-*a* that includes similar information to index table 400 and second table information 925-*b* that includes similar information to index table 500. If 256QAM was determined by enable component 922-2 as not enabled, determine component 922-3 would use first table information 924-*a* to determine the first MCS to use. If 256QAM was determined by enable component 922-2 as enabled, determine component 922-3 would use second table information 925-*b* to determine the first MCS to use.

In some examples, apparatus 900 may also include an MCS component 922-4. MCS component 922-4 may be executed by processor circuit 920 to receive downlink transmissions over the PMCH from the one or more eNBs. For these examples, downlink transmissions may include multicast data 915.

According to some examples, receive component 922-1 may also receive a MBMS-AreaInfoList IE that includes information in a signallingMCS field that indicates a second MCS to use for receiving downlink transmissions from the one or more eNBs over a PMCCH. For these examples, the MBMS-AreaInfoList IE may be included in MBMS-InfoList IE 930 and the signallingMCS field may point to an MCS index value that may come from either first table information 924-*a* or second information table information 925-*b* depending on whether 256QAM is possible for the PMCCH. Also, for these examples, MCS component 922-5 may use the second MCS to receive downlink transmissions over the PMCCH from the one or more eNBs. The downlink transmissions may include multicast control data 935.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by receive component 922-1, enable component 922-2 or determine component 922-3 for apparatus 900 located at or with an UE.

In the illustrated example shown in FIG. 10, logic flow 1000 at block 1002 may receive, at an UE capable of operating in compliance with o one or more 3GPP LTE standards including LTE-A, a PMCH-InfoList IE from one or more eNBs that includes a field indicating whether 256QAM is enabled for receiving downlink transmissions over a PMCH from the one or more eNBs. For these examples, receive component 922-1 may receive the PMCH-InfoList IE.

According to some examples, logic flow 1000 at block 1004 may determine whether 256QAM is enabled. For these examples, enable component 922-2 may determine whether 256QAM is enabled.

In some examples, logic flow 1000 at block 1006 may determine a first MCS to use for receiving downlink transmissions over the PMCH based on a value indicated in a dataMCS field of the PMCH-InfoList IE and based on whether 256QAM is determined to be enabled. For these examples, determine component 922-3 may determine the first MCS.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
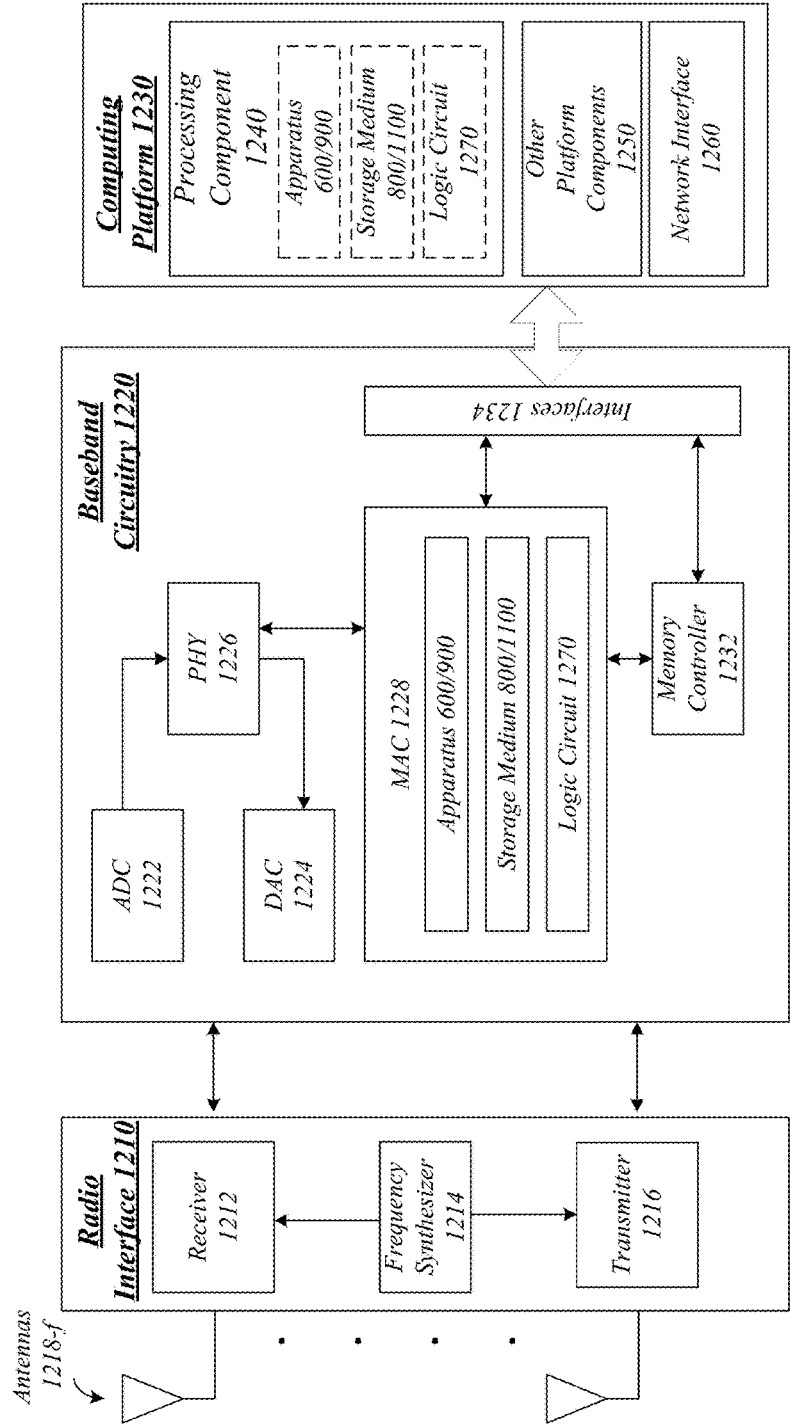
FIG. 12 illustrates an example of a device.

FIG. 12 illustrates an embodiment of a device 1200 for use in a broadband wireless access network. Device 1200 may implement, for example, apparatus 600/900, storage medium 800/1100 and/or a logic circuit 1270. The logic circuit 1270 may include physical circuits to perform operations described for apparatus 600/900. As shown in FIG. 12, device 1200 may include a radio interface 1210, baseband circuitry 1220, and computing platform 1230, although examples are not limited to this configuration.

The device 1200 may implement some or all of the structure and/or operations for the apparatus 600/900, storage medium 800/1100 and/or logic circuit 1270 in a single computing entity, such as entirely within a single device. Alternatively, the device 1200 may distribute portions of the structure and/or operations for apparatus 600/900, storage medium 800/1100 and/or logic circuit 1270 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218-*f*. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with MAC processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames (e.g., containing subframes). Alternatively or in addition, MAC processing circuit 1228 may share processing for certain of these functions or perform these processes independent of PHY processing circuit 1226. In some embodiments, MAC and PHY processing may be integrated into a single circuit.

Computing platform 1230 may provide computing functionality for device 1200. As shown, computing platform 1230 may include a processing component 1240. In addition to, or alternatively of, baseband circuitry 1220 of device 1200 may execute processing operations or logic for apparatus 600/900, storage medium 800/1100, and logic circuit 1270 using the processing component 1230. Processing component 1240 (and/or PHY 1226 and/or MAC 1228) may comprise various hardware elements, software elements, or a combination of both. Examples of hardware elements may include devices, logic devices, components, processors, microprocessors, circuits, processor circuits (e.g., processor circuit 620 or 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1230 may further include a network interface 1260. In some examples, network interface 1260 may include logic and/or features to support wireless network interfaces as described in one or more 3GPP LTE or LTE-A specifications or standards. For these examples, network interface 1260 may enable an apparatus 600 or 900 located at respective eNB and UE to communicate with each other or with other networked devices.

Device 1200 may be, for example, a computer, a personal computer (PC), a desktop computer, a laptop computer, an ultrabook computer, a smartphone, a tablet computer, a notebook computer, a netbook computer, a work station, a mini-computer, multiprocessor system, processor-based system, wireless access point, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using multiple input multiple output (MIMO) communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 13:
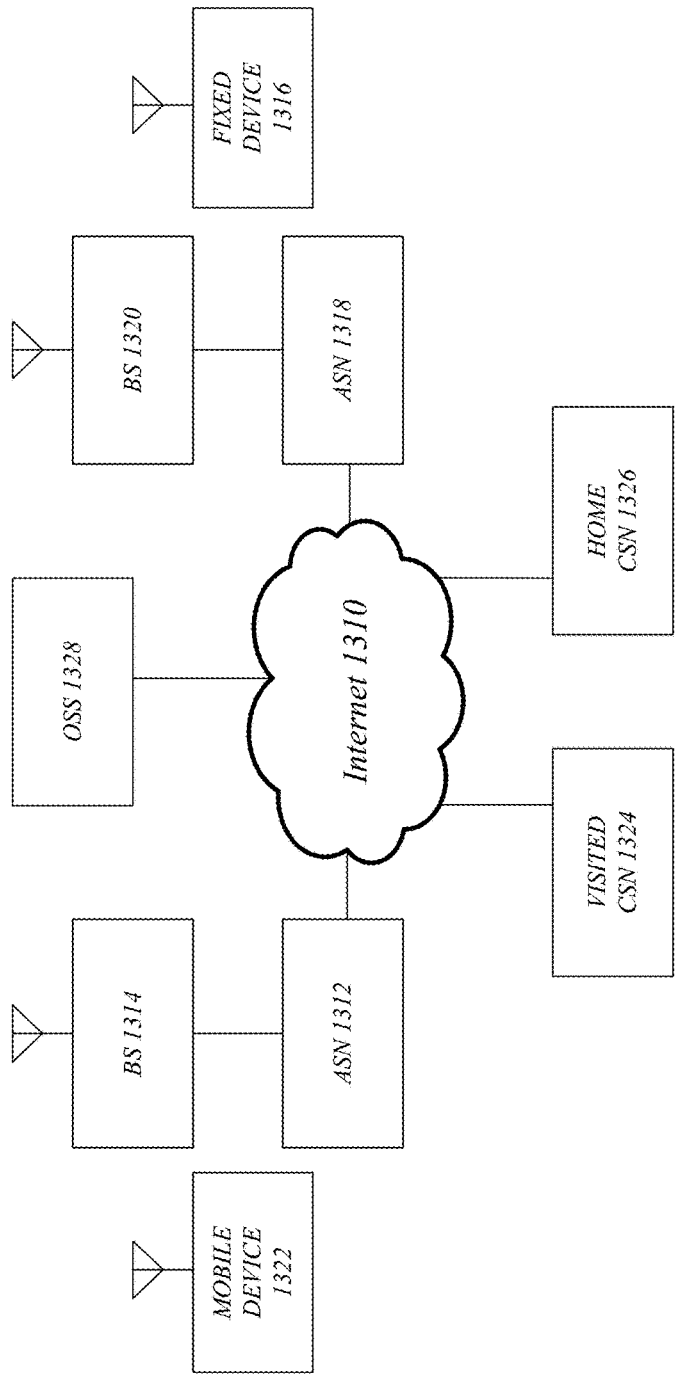
FIG. 13 illustrates an example of a broadband wireless access system.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1300, access service networks (ASN) 1312, 1318 are capable of coupling with base stations (BS) 1314, 1320 (RRHs or eNBs), respectively, to provide wireless communication between one or more fixed devices 1316 and internet 1310, or one or more mobile devices 1322 and Internet 1310. One example of a fixed device 1316 and a mobile device 1322 may be a UE such as UE 130 shown in FIG. 1, with the fixed device 1316 comprising a stationary version of UE 130 and the mobile device 1322 comprising a mobile version of UE 130. ASN 1312 may implement profiles that are capable of defining the mapping of network functions to one or more physical entities on broadband wireless access system 1300. Base stations 1314, 1320 (or eNBs) may comprise radio equipment to provide RF communication with fixed device 1316 and mobile device 1322, such as described with reference to device 1300, and may comprise, for example, the PHY, MAC, RLC or PDCP layer equipment in compliance with a 3GPP LTE Specification or an IEEE 802.16 Standard. Base stations 1314, 1320 (or eNBs) may further comprise an IP backplane to couple to Internet 1310 via ASN 1312, 1318, respectively, although the scope of the claimed subject matter is not limited in these respects.

Broadband wireless access system 1300 may further comprise a visited connectivity service network (CSN) 1324 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1324 or home CSN 1326, and the scope of the claimed subject matter is not limited in these respects. Visited CSN 1324 may be referred to as a visited CSN in the case where visited CSN 1324 is not part of the regular service provider of fixed device 1316 or mobile device 1322, for example where fixed 1316 or mobile device 1322 is roaming away from their respective home CSN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322.

Fixed device 1316 may be located anywhere within range of one or both base stations 1314, 1320, such as in or near a home or business to provide home or business customer broadband access to Internet 1310 via base stations 1314, 1320 and ASN 1312, 1318, respectively, and home CSN 1326. It is worthy to note that although fixed device 1316 is generally disposed in a stationary location, it may be moved to different locations as needed. Mobile device 1322 may be utilized at one or more locations if mobile device 1322 is within range of one or both base stations 1314, 1320, for example.

In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include a processor circuit for an eNB. The apparatus may also include an enable component for execution by the processor circuit to generate a PMCH-InfoList IE that includes a field indicating whether 256QAM is enabled for downlink transmissions to one or more UEs over a PMCH. The apparatus may also include a send component for execution by the processor circuit to cause the PMCH-InfoList IE to be sent to the one or more UEs.

EXAMPLE 2

The apparatus of example 1 may also include a select component for execution by the processor circuit to select a value for a dataMCS field of the PMCH-InfoList IE that indicates a first MCS to use for the downlink transmissions to the one or more UEs over the PMCH, the value based on whether 256QAM is enabled.

EXAMPLE 3

The apparatus of example 2 may also include a control information component for execution by the processor circuit to generate a MBMS-AreaInfoList IE that includes information in a signallingMCS field to indicate a second MCS to use for downlink transmissions to the one or more UEs over a PMCCH. For this example, the send component may cause the MBMSAreaInfoList IE to be sent to the one or more UEs.

EXAMPLE 4

The apparatus of example 3, the second MCS may be the same as the first MCS.

EXAMPLE 5

The apparatus of example 2, the enable component may generate the PMCH-InfoList IE according to a first 3GPP TS to include TS 36.331. The value selected for the dataMCS field by the select component may indicate the first MCS to use includes an MCS index value for a first modulation and TBS index table for PDSCH included in a second 3GPP TS to include TS 36.213 or for a second modulation and TBS index table for PDSCH also included in TS 36.213.

EXAMPLE 6

The apparatus of example 5, the enable component may cause the field indicating whether 256QAM is enabled to indicate that 256QAM is not enabled. For this example, the one or more UEs may be arranged to determine the first MCS to use for the downlink transmissions that includes a modulation order of less than or equal to 6 based on the first modulation and TBS index table and the MCS index value.

EXAMPLE 7

The apparatus of example 5, the enable component may cause the field indicating whether 256QAM is enabled to indicate that 256QAM is enabled. For this example, the one or more UEs may be arranged to determine the first MCS to use for the downlink transmissions that includes a modulation order of at least 8 based on the second modulation and TBS index table and the MCS index value.

EXAMPLE 8

The apparatus of example 1 may also include a digital display coupled to the processor circuit to present a user interface view.

EXAMPLE 9

An example apparatus may include a processor circuit for an eNB capable of operating in compliance with one or more 3GPP LTE standards including LTE-A. The example apparatus may also include an enable component for execution by the processor circuit to generate a PMCH-InfoList IE that includes a field indicating whether 256QAM is enabled for downlink transmissions to one or more UEs over a PMCH. The apparatus may also include a select component for execution by the processor circuit to select a value for a dataMCS field of the PMCH-InfoList IE that indicates a first MCS to use for the downlink transmissions to the one or more UEs over the PMCH, the value based on whether 256QAM is enabled. The apparatus may also include a send component for execution by the processor circuit to cause the PMCH-InfoList IE to be sent to the one or more UEs.

EXAMPLE 10

The apparatus of example 9 may also include a control information component for execution by the processor circuit to generate a MBMS-AreaInfoList IE that includes information in a signallingMCS field to indicate a second MCS to use for downlink transmissions to the one or more UEs over a PMCCH. For this example, the send component to may cause the MBMSAreaInfoList IE to be sent to the one or more UEs.

EXAMPLE 11

The apparatus of example 10, the second MCS may be the same as the first MCS.

EXAMPLE 12

The apparatus of example 9, the enable component may generate the PMCH-InfoList IE according to a first 3GPP TS to include TS 36.331. The value may be selected for the dataMCS field by the select component to indicate the first MCS to use includes an MCS index value for a first modulation and TBS index table for PDSCH included in a second 3GPP TS to include TS 36.213 or for a second modulation and TBS index table for PDSCH also included in TS 36.213.

EXAMPLE 13

The apparatus of example 12, the enable component may cause the field indicating whether 256QAM is enabled to indicate that 256QAM is not enabled. For this example, the one or more UEs may be arranged to determine the first MCS to use for the downlink transmissions that includes a modulation order of less than or equal to 6 based on the first modulation and TBS index table and the MCS index value.

EXAMPLE 14

The apparatus of example 12, the enable component may cause the field indicating whether 256QAM is enabled to indicate that 256QAM is not enabled. For this example, the one or more UEs may be arranged to determine the first MCS to use for the downlink transmissions that includes a TBS index of less than or equal to 26 based on the first modulation and TBS index table and the MCS index value.

EXAMPLE 15

The apparatus of example 12, the enable component may cause the field indicating whether 256QAM is enabled to indicate that 256QAM is enabled. For this example, the one or more UEs arranged to determine the first MCS to use for the downlink transmissions that includes a modulation order of at least 8 based on the second modulation and TBS index table and the MCS index value.

EXAMPLE 16

The apparatus of example 12, the enable component may cause the field indicating whether 256QAM is enabled to indicate that 256QAM is enabled. For this example, the one or more UEs may be arranged to determine the first MCS to use for the downlink transmissions that includes a TBS index of at least 25 based on the second modulation and TBS index table and the MCS index value.

EXAMPLE 17

The apparatus of example 9 may also include a digital display coupled to the processor circuit to present a user interface view.

EXAMPLE 18

An example method may include generating, at an eNB capable of operating in compliance with one or more 3GPP LTE standards including LTE-A, a PMCH-InfoList IE that includes a field indicating whether 256QAM is enabled for downlink transmissions to one or more UEs over a PMCH. The method may also include selecting a value for a dataMCS field of the PMCH-InfoList IE that indicates a first MCS to use for the downlink transmissions to the one or more UEs over the PMCH, the value based on whether 256QAM is enabled. The method may also include sending the PMCH-InfoList IE to the one or more UEs.

EXAMPLE 19

The method of example 18 may also include generating, at the eNB, a MBMS-AreaInfoList IE that includes information in a signallingMCS field to indicate a second MCS to use for downlink transmissions to the one or more UEs over a PMCCH. The method may also include sending the MBMSAreaInfoList IE to the one or more UEs.

EXAMPLE 20

The method of example 19, the second MCS may be the same as the first MCS.

EXAMPLE 21

The method of example 18, generating the PMCH-InfoList IE according to a first 3GPP TS may include TS 36.331. For this example, the value selected for the dataMCS field that indicates the first MCS to use comprises an MCS index value for a first modulation and TBS index table for PDSCH included in a second 3GPP TS to include TS 36.213 or for a second modulation and TBS index table for PDSCH also included in TS 36.213.

EXAMPLE 22

The method of example 21 may include the field indicating whether 256QAM is enabled indicates that 256QAM is not enabled. The method may also include using the first modulation and TBS index table and the MCS index value to determine the first MCS to use for the downlink transmissions that includes a modulation order of less than or equal to 6.

EXAMPLE 23

The method of example 21 may include the field indicating whether 256QAM is enabled indicates that 256QAM is not enabled. The method may also include using the first modulation and TBS index table and the MCS index value to determine the first MCS to use for the downlink transmissions that includes a TBS index of less than or equal to 26.

EXAMPLE 24

The method of example 21 may include the field indicating whether 256QAM is enabled indicates that 256QAM is enabled. The method may also include using the second modulation and TBS index table and the MCS index value to determine the first MCS to use for the downlink transmissions that includes a modulation order of at least 8.

EXAMPLE 25

The method of example 21 may include the field indicating whether 256QAM is enabled indicates that 256QAM is enabled. The method may also include using the second modulation and TBS index table and the MCS index value to determine the first MCS to use for the downlink transmissions that includes a TBS index of at least 25.

EXAMPLE 26

An example at least one machine readable medium may include a plurality of instructions that in response to being executed on a system at an eNB may cause the system to carry out a method according to any one of examples 18 to 25.

EXAMPLE 27

An example apparatus may include means for performing the methods of any one of examples 18 to 25.

EXAMPLE 28

An example at least one machine readable medium may include a plurality of instructions that in response to being executed on a system for an eNB capable of operating in compliance with one or more or more 3GPP LTE standards including LTE-A may cause the system to generate a PMCH-InfoList IE that includes a field indicating whether 256QAM is enabled for downlink transmissions to one or more UEs over a PMCH. The instructions may also cause the system to select a value for a dataMCS field of the PMCH-InfoList IE that indicates a first MCS to use for the downlink transmissions to the one or more UEs over the PMCH, the value based on whether 256QAM is enabled. The instructions may also cause the system to send the PMCH-InfoList IE to the one or more UEs.

EXAMPLE 29

The at least one machine readable medium of example 28, the instructions may further cause the system to generate a MBMS-AreaInfoList IE that includes information in a signallingMCS field to indicate a second MCS to use for downlink transmissions to the one or more UEs over a PMCCH. The instructions may also cause the system to send the MBMSAreaInfoList IE to the one or more UEs.

EXAMPLE 30

The at least one machine readable medium of example 29, the second MCS may be the same as the first MCS.

EXAMPLE 31

The at least one machine readable medium of example 28, the instructions may also cause the system to generate the PMCH-InfoList IE according to a first 3GPP TS to include TS 36.331. For this example, the value selected for the dataMCS field that indicates the first MCS to use may include an MCS index value for a first modulation and TBS index table for PDSCH included in a second 3GPP TS to include TS 36.213 or for a second modulation and TBS index table for PDSCH also included in TS 36.213.

EXAMPLE 32

The at least one machine readable medium of example 31, the instructions may cause the system to cause the field indicating whether 256QAM is enabled to indicate that 256QAM is not enabled. For this example, the one or more UEs may be arranged to determine the first MCS to use for the downlink transmissions a modulation order of less than or equal to 6 based on the first modulation and TBS index table and the MCS index value.

EXAMPLE 33

The at least one machine readable medium of example 31 the instructions may cause the system to cause the field indicating whether 256QAM is enabled to indicate that 256QAM is not enabled. For this example, the one or more UEs arranged to determine the first MCS to use for the downlink transmissions that includes a TBS index of less than or equal to 26 based on the first modulation and TBS index table and the MCS index value.

EXAMPLE 34

The at least one machine readable medium of example 31, the instructions may cause the system to cause the field indicating whether 256QAM is enabled to indicate that 256QAM is enabled. For this example, the one or more UEs arranged to determine the first MCS to use for the downlink transmissions a modulation order of at least 8 based on the first modulation and TBS index table and the MCS index value.

EXAMPLE 35

The at least one machine readable medium of example 31, the instructions may cause the system to cause the field indicating whether 256QAM is enabled to indicate that 256QAM is enabled. For this example, the one or more UEs arranged to determine the first MCS to use for the downlink transmissions that includes a TBS index of at least 25 based on the second modulation and TBS index table and the MCS index value.

EXAMPLE 36

An example apparatus may include a processor circuit for an UE capable of operating in compliance with one or more 3GPP LTE standards including LTE-A. The apparatus may also include a receive component for execution by the processor circuit to receive a PMCH-InfoList IE from one or more eNBs that includes a field indicating whether 256QAM is enabled for receiving downlink transmissions over a PMCH from the one or more eNBs. The apparatus may also include an enable component for execution by the processor circuit to determine whether 256QAM is enabled. The apparatus may also include a determine component for execution by the processor circuit to determine a first MCS to use for receiving downlink transmissions over the PMCH based on a value indicated in a dataMCS field of the PMCH-InfoList IE and based on whether 256QAM is determined to be enabled. The apparatus may also include an MCS component for execution by the processor circuit to use the first MCS to receive the downlink transmissions over the PMCH from the one or more eNBs.

EXAMPLE 37

The apparatus of example 35 may include the receive component to receive a MBMS-AreaInfoList IE that includes information in a signallingMCS field that indicates a second MCS to use for receiving downlink transmissions from the one or more eNBs over a PMCCH. The apparatus may also include the MCS component to use the second MCS to receive the downlink transmissions over the PMCCH from the one or more eNBs.

EXAMPLE 38

The apparatus of example 37, the second MCS may be the same as the first MCS.

EXAMPLE 39

The apparatus of example 35, the PMCH-InfoList IE may be generated by the one or more eNBs according to a first 3GPP TS to include TS 36.331. For this example, the value indicated in the dataMCS field may include an MCS index value for a first modulation and TBS index table for PDSCH included in a second 3GPP TS to include TS 36.213 or for a second modulation and TBS index table for PDSCH also included in TS 36.213.

EXAMPLE 40

The apparatus of example 39, the field indicating whether 256QAM is enabled indicates that 256QAM is not enabled. For this example, the determine component may use the first modulation and TBS index table and the MCS index value to determine the first MCS to use for receiving the downlink transmissions over the PMCH, the first MCS including a modulation order of less than or equal to 6.

EXAMPLE 41

The apparatus of example 39, the field indicating whether 256QAM is enabled indicates that 256QAM is not enabled. For this example, the determine component may use the first modulation and TBS index table and the MCS index value to determine the first MCS to use for receiving downlink transmissions over the PMCH, the first MCS including a TBS index of less than or equal to 26.

EXAMPLE 42

The apparatus of example 39, the field indicating whether 256QAM is enabled indicates that 256QAM is enabled. For this example, the determine component may use the second modulation and TBS index table and the MCS index value to determine the first MCS to use for receiving the downlink transmissions over the PMCH, the first MCS including a modulation order of at least 8.

EXAMPLE 43

The apparatus of example 39, the field indicating whether 256QAM is enabled indicates that 256QAM is enabled. For this example, the determine component may use the second modulation and TBS index table and the MCS index value to determine the first MCS to use for receiving the downlink transmissions over the PMCH, the first MCS including a TBS index of at least 25.

EXAMPLE 44

The apparatus of example 36 may also include a digital display coupled to the processor circuit to present a user interface view.

EXAMPLE 45

An example method may include receiving, at an UE capable of operating in compliance with one or more 3GPP LTE standards including LTE-A, a PMCH-InfoList IE from one or more eNBs that includes a field indicating whether 256QAM is enabled for receiving downlink transmissions over a PMCH from the one or more eNBs. The method may also include determining whether 256QAM is enabled. The method may also include determining a first MCS to use for receiving downlink transmissions over the PMCH based on a value indicated in a dataMCS field of the PMCH-InfoList IE and based on whether 256QAM is determined to be enabled. The method may also include using the first MCS to receive the downlink transmissions over the PMCH from the one or more eNBs.

EXAMPLE 46

The method of example 45 may include receiving, at the UE, a MBMS-AreaInfoList IE that includes information in a signallingMCS field that indicates a second MCS to use for receiving downlink transmissions from the one or more eNBs over a PMCCH. The method may also include using the second MCS to receive the downlink transmissions over the PMCCH from the one or more eNBs.

EXAMPLE 47

The method of example 46, the second MCS may be the same as the first MCS.

EXAMPLE 48

The method of example 45, the PMCH-InfoList IE may be generated by the one or more eNBs according to a first 3GPP TS to include TS 36.331. For this example, the value indicated in the dataMCS field may include an MCS index value for a first modulation and TBS index table for PDSCH included in a second 3GPP TS to include TS 36.213 or for a second modulation and TBS index table for PDSCH also included in TS 36.213.

EXAMPLE 49

The method of example 48, the field indicating whether 256QAM is enabled indicates that 256QAM is not enabled. For this example, the first modulation and TBS index table and the MCS index value may be used to determine the first MCS to use for receiving the downlink transmissions over the PMCH, the first MCS including a modulation order of less than or equal to 6.

EXAMPLE 50

The apparatus of example 48, the field indicating whether 256QAM is enabled indicates that 256QAM is not enabled. For this example, the first modulation and TBS index table and the MCS index value may be used to determine the first MCS to use for receiving downlink transmissions over the PMCH, the first MCS including a TBS index of less than or equal to 26.

EXAMPLE 51

The method of example 48, the field indicating whether 256QAM is enabled indicates that 256QAM is enabled. For this example, the second modulation and TBS index table and the MCS index value may be used to determine the first MCS to use for receiving the downlink transmissions over the PMCH, the first MCS including a modulation order of at least 8.

EXAMPLE 52

The apparatus of example 48, the field indicating whether 256QAM is enabled indicates that 256QAM is enabled. For this example, the second modulation and TBS index table and the MCS index value may be used to determine the first MCS to use for receiving the downlink transmissions over the PMCH, the first MCS including a TBS index of at least 25.

EXAMPLE 53

An example at least one machine readable medium may include a plurality of instructions that in response to being executed on a system at UE may cause the system to carry out a method according to any one of examples 45 to 52.

EXAMPLE 54

An example apparatus may include means for performing the methods of any one of examples 45 to 52.

EXAMPLE 55

An example at least one machine readable medium may include a plurality of instructions that in response to being executed on a system for UE capable of operating in compliance with one or more or more 3GPP LTE standards including LTE-A may cause the system to receive a PMCH-InfoList IE from one or more eNBs that includes a field indicating whether 256QAM is enabled for receiving downlink transmissions over a PMCH from the one or more eNBs. The instructions may also cause the system to determine whether 256QAM is enabled. The instructions may also cause the system to determine a first MCS to use for receiving downlink transmissions over the PMCH based on a value indicated in a dataMCS field of the PMCH-InfoList IE and based on whether 256QAM is determined to be enabled. The instructions may also cause the system to use the first MCS to receive the downlink transmissions over the PMCH from the one or more eNBs.

EXAMPLE 56

The at least one machine readable medium of example 55, the instructions may further cause the system to receive a MBMS-AreaInfoList IE that includes information in a signallingMCS field that indicates a second MCS to use for receiving downlink transmissions from the one or more eNBs over a PMCCH. The instructions may also cause the system to use the second MCS to receive the downlink transmissions over the PMCCH from the one or more eNBs.

EXAMPLE 57

The at least one machine readable medium of example 56, the second MCS may be the same as the first MCS.

EXAMPLE 58

The at least one machine readable medium of example 55, the PMCH-InfoList IE may be generated by the one or more eNBs according to a first 3GPP TS to include TS 36.331. For this example, the value indicated in the dataMCS field comprises an MCS index value for a first modulation and TBS index table for PDSCH included in a second 3GPP TS to include TS 36.213 or for a second modulation and TBS index table for PDSCH also included in TS 36.213.

EXAMPLE 59

The at least one machine readable medium of example 58, the field indicating whether 256QAM is enabled indicates that 256QAM is not enabled. For this example, the instructions may further cause the system to use the first modulation and TBS index table and the MCS index value to determine the first MCS to use for receiving the downlink transmissions over the PMCH, the first MCS including a modulation order of less than or equal to 6.

EXAMPLE 60

The at least one machine readable medium of example 58, the field indicating whether 256QAM is enabled indicates that 256QAM is not enabled. For this example, the instructions may further cause the system to use the first modulation and TBS index table and the MCS index value to determine the first MCS to use for receiving the downlink transmissions over the PMCH, the first MCS including a TBS index of less than or equal to 26.

EXAMPLE 61

The at least one machine readable medium of example 58, the field indicating whether 256QAM is enabled indicates that 256QAM is enabled. For this example, the instructions may further cause the system to use the second modulation and TBS index table and the MCS index value to determine the first MCS to use for receiving the downlink transmissions over the PMCH, the first MCS including a modulation order of at least 8.

EXAMPLE 62

The at least one machine readable medium of example 58, the field indicating whether 256QAM is enabled indicates that 256QAM is enabled. For this example, the instructions may further cause the system to use the second modulation and TBS index table and the MCS index value to determine the first MCS to use for receiving the downlink transmissions over the PMCH, the first MCS including TBS index of at least 25.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a memory;
   a processor circuit for an evolved Node B (eNB), the processor circuit coupled with the memory, the processor circuit to execute logic, at least a portion of which is in hardware, the logic to:
   generate a physical multicast channel-InfoList (PMCH-InfoList) information element (IE) that includes a field to indicate 256 quadrature amplitude modulation (256QAM) for downlink transmissions to one or more user equipment (UEs) over a physical multicast channel (PMCH);
   select a value for a dataMCS field of the PMCH-InfoList IE that indicates to a modulation coding scheme (MCS) index value for a modulation and transport block size (TBS) index table for physical downlink shared channel (PDSCH), the MCS index value to indicate a first MCS for downlink transmissions received from the eNB that has a modulation order of 8; and
   cause the PMCH-InfoList IE to be transmitted to the one or more UEs for the one or more UEs to use the PMCH-Infolist IE to receive downlink transmissions over the PMCH from the eNB.

2. The apparatus of claim 1, comprising the logic to:
   generate the PMCH-InfoList IE according to a first 3rd Generation Partnership Project (3GPP) technical specification (TS) including TS 36.331, the MCS index value for the TBS index table for PDSCH selected from a table included in a second 3GPP TS including TS 36.213.

3. The apparatus of claim 1, comprising the logic to:
   cause 256QAM to be used for downlink transmissions that include multicasting data to the one or more UEs over the PMCH.

4. The apparatus of claim 1, comprising the logic to:
   generate a multi-broadcast multicast service-AreaInfoList (MBMS-AreaInfoList) IE that includes information in a signallingMCS field to indicate a second MCS for downlink transmissions to the one or more UEs over a physical multicast control channel (PMCCH); and
   cause the MBMS-AreaInfoList IE to be transmitted to the one or more UEs.

5. The apparatus of claim 4, the second MCS is the same as the first MCS.

6. At least one non-transitory machine readable medium comprising a plurality of instructions that in response to being executed on a system for an evolved Node B (eNB) causes the system to:
   generate a physical multicast channel-InfoList (PMCH-InfoList) information element (IE) that includes a field to indicate 256 quadrature amplitude modulation (256QAM) for downlink transmissions to one or more user equipment (UEs) over a physical multicast channel (PMCH);
   select a value for a dataMCS field of the PMCH-InfoList IE that indicates a modulation coding scheme (MCS) index value for a modulation and transport block size (TBS) index table for physical downlink shared channel (PDSCH), the MCS index value to indicate a first MCS for downlink transmissions received from the eNB that has a TBS index of at least 25; and
   cause the PMCH-InfoList IE to be transmitted to the one or more UEs for the one or more UEs to use the PMCH-Infolist IE to receive downlink transmissions over the PMCH from the eNB.

7. The at least one non-transitory machine readable medium of claim 6, the instructions to cause the system to generate the PMCH-InfoList IE according to a first 3rd Generation Partnership Project (3GPP) technical specification (TS) including TS 36.331, the MCS index value for the TBS index table for PDSCH selected from a table included in a second 3GPP TS including TS 36.213.

8. The at least one non-transitory machine readable medium of claim 7, the instructions to further cause the system to:
   cause 256QAM to be used for downlink transmissions that include multicasting data to the one or more UEs over the PMCH.

9. The at least one non-transitory machine readable medium of claim 6, comprising the instructions to further cause the system to:
   generate a multi-broadcast multicast service-AreaInfoList (MBMS-AreaInfoList) IE that includes information in a signallingMCS field to indicate a second MCS for downlink transmissions to the one or more UEs over a physical multicast control channel (PMCCH); and
   cause the MBMS-AreaInfoList IE to be transmitted to the one or more UEs.

10. The at least one non-transitory machine readable medium of claim 9, the second MCS is the same as the first MCS.

11. An apparatus comprising:
    a radio interface for user equipment (UE); and
    baseband circuitry for the UE, the baseband circuitry to execute logic, at least a portion of which is in hardware, the logic to:
    receive a physical multicast channel-InfoList (PMCH-InfoList) information element (IE) from one or more evolved Node B (eNBs) that includes a field indicating 256 quadrature amplitude modulation (256QAM) for downlink transmissions from the one or more eNBs over a physical multicast channel (PMCH);

select a modulation and transport block size (TBS) index table for physical downlink shared channel (PDSCH) to determine a first modulation coding scheme (MCS) to receive downlink transmissions over the PMCH based on the field indicating 256QAM for downlink transmissions from the one or more eNBs over the PMCH;

determine the first MCS for receiving downlink transmissions over the PMCH based on a value for a dataMCS field of the PMCH-InfoList IE that indicates an MCS index value for the selected modulation and TBS index table for PDSCH, the MCS index value to indicate a TBS index of at least 25; and cause the radio interface to use the first MCS to receive downlink transmissions over the PMCH from the one or more eNBs.

12. The apparatus of claim 11, the PMCH-InfoList IE arranged according to a first 3rd Generation Partnership Project (3GPP) technical specification (TS) including TS 36.331, the selected TBS index table for PDSCH based on a table included in a second 3GPP TS including TS 36.213.

13. The apparatus of claim 12, cause the radio interface to use the first MCS to receive downlink transmissions comprises the logic to cause the radio interface to receive multicasting data from the one or more eNBs over the PMCH via use of 256QAM.

14. The apparatus of claim 11, comprising the logic to:
receive a multi-broadcast multicast service-AreaInfoList (MBMS-AreaInfoList) IE that includes information in a signallingMCS field that indicates a second MCS to use to receive downlink transmissions from the one or more eNBs over a physical multicast control channel (PMCCH); and
cause the radio interface to use the second MCS to receive downlink transmissions over the PMCCH from the one or more eNBs.

15. At least one non-transitory machine readable medium comprising a plurality of instructions that in response to being executed on a system for user equipment (UE) causes the system to:
receive a physical multicast channel-InfoList (PMCH-InfoList) information element (IE) from one or more evolved Node B (eNBs) that includes a field indicating 256 quadrature amplitude modulation (256QAM) for downlink transmissions from the one or more eNBs over a physical multicast channel (PMCH);

select a modulation and transport block size (TBS) index table for physical downlink shared channel (PDSCH) to use to determine a first modulation coding scheme (MCS) to receive downlink transmissions over the PMCH based on the field indicating 256QAM for downlink transmissions from the one or more eNBs over the PMCH;

determine the first MCS to receive downlink transmissions over the PMCH based on a value for a dataMCS field of the PMCH-InfoList IE that indicates an MCS index value for the selected modulation and TBS index table for PDSCH, the MCS index value to indicate a modulation order of 8; and cause a radio interface for the UE to use the first MCS to receive downlink transmission over the PMCH from the one or more eNBs.

16. The at least one non-transitory machine readable medium of claim 15, the PMCH-InfoList IE arranged according to a first 3rd Generation Partnership Project (3GPP) technical specification (TS) including TS 36.331, the MCS index value for the selected TBS index table for PDSCH based on a table included in a second 3GPP TS including TS 36.213.

17. The at least one non-transitory machine readable medium of claim 15, the instructions to cause the system to cause the radio interface to use the first MCS to receive downlink transmissions comprises the system to cause the radio interface to receive multicasting data from the one or more eNBs over the PMCH via use of 256QAM.

18. The at least one non-transitory machine readable medium of claim 15, comprising the instructions to further cause the system to:
receive a multi-broadcast multicast service-AreaInfoList (MBMS-AreaInfoList) IE that includes information in a signallingMCS field that indicates a second MCS to use for receiving downlink transmissions from the one or more eNBs over a physical multicast control channel (PMCCH); and
use the second MCS to receive the downlink transmissions over the PMCCH from the one or more eNBs.

* * * * *